United States Patent
Basso et al.

(10) Patent No.: US 8,180,880 B2
(45) Date of Patent: May 15, 2012

(54) ACTIVE INTELLIGENT CONTENT

(75) Inventors: Andrea Basso, Marlboro, NJ (US);
Vishwa M. Prasad, Old Bridge, NJ (US)

(73) Assignee: AT&T Intellectual Property I, L.P.,
Atlanta, GA (US)

( * ) Notice: Subject to any disclaimer, the term of this patent is extended or adjusted under 35 U.S.C. 154(b) by 0 days.

(21) Appl. No.: 12/625,986

(22) Filed: Nov. 25, 2009

(65) Prior Publication Data

US 2011/0126025 A1    May 26, 2011

(51) Int. Cl.
*G06F 12/14*    (2006.01)
(52) U.S. Cl. .................... 709/223; 709/217; 370/389
(58) Field of Classification Search .............. 709/223, 709/217
See application file for complete search history.

(56) References Cited

U.S. PATENT DOCUMENTS

| | | | | |
|---|---|---|---|---|
| 6,690,762 B1 * | 2/2004 | Berestov | ................. | 378/62 |
| 7,016,963 B1 | 3/2006 | Judd et al. | | |
| 7,412,402 B2 * | 8/2008 | Cooper | ................. | 705/7.42 |
| 7,610,551 B2 | 10/2009 | Nandiwada et al. | | |
| 7,792,756 B2 * | 9/2010 | Plastina et al. | ................. | 705/51 |
| 2001/0046326 A1 * | 11/2001 | Felts et al. | ................. | 382/240 |
| 2005/0084240 A1 * | 4/2005 | Faisy | ................. | 386/83 |
| 2005/0137852 A1 * | 6/2005 | Chari et al. | ................. | 704/7 |
| 2006/0095285 A1 * | 5/2006 | Sol et al. | ................. | 705/1 |
| 2006/0184639 A1 | 8/2006 | Chua et al. | | |
| 2006/0288284 A1 * | 12/2006 | Peters et al. | ................. | 715/700 |
| 2007/0174488 A1 | 7/2007 | Kamyshenko et al. | | |
| 2008/0267386 A1 * | 10/2008 | Cooper | ................. | 379/265.06 |
| 2010/0049817 A1 * | 2/2010 | Xu | ................. | 709/206 |
| 2010/0280992 A1 * | 11/2010 | Vaysburg et al. | ................. | 707/634 |

* cited by examiner

*Primary Examiner* — Wing Chan
*Assistant Examiner* — Tesfay Yohannes

(57) ABSTRACT

Active intelligent content is aware of its own timeline, lifecycle, capabilities, limitations, and related information. The active intelligent content is aware of its surroundings and can convert automatically into a format or file type more conducive to the device or environment it is stored in. If the active intelligent content does not have the required tools to make such a transformation, it is self-aware enough to seek out the tools and/or information to make that transformation. Such active intelligent content can be used for enhanced file portability, target advertising, personalization of media, and selective encryption, enhancement, and restriction. The content can also be used to collaborate with other content and provide users with enhanced information based on user preferences, ratings, costs, genres, file types, and the like.

9 Claims, 4 Drawing Sheets

ACTIVE INTELLIGENT CONTENT

BACKGROUND OF THE INVENTION

The present disclosure relates generally to content manipulation and more particularly to the design and implementation of active intelligent multimedia content.

As described herein, content is information that may provide value for an end-user/audience in specific contexts. Content may be delivered via any medium such as audio, video, text, or the like. Though content is stored and/or transmitted via media (e.g., electronic media, wired and/or wireless signals, analog and/or digital recordings, etc.), the terms "content" and "media" are used interchangeably herein to describe the combined form of the content that is stored in a particularly media type. The static understanding of a particular type of content (e.g., a song, etc.) stored in media (e.g., an audio file in Windows Media Audio (WMA) format, etc.) on a device (e.g., a portable media player, etc.) leads to a static use of the underlying content.

Presently, content may need to be stored in more than one location in different formats, environments, etc. For example, an audio recording stored on a portable media player may require a particular digital rights management (DRM), format, and delivery mechanism that is different from the DRM, format, and delivery mechanism used to play and/or store that same audio recording on a personal computer.

In general the media files require transformation and/or adaptation to become playable. As a result, if a user moves a media file from one media player to another media player it is very likely that it will not play correctly or it will not play at all. This limitation is related to the fact that the file itself does not have the capability to point to the needed tools to transform itself to become playable in a given environment or to be able to be transported on a given network.

BRIEF SUMMARY OF THE INVENTION

The present disclosure generally provides methods for content transformation. In one embodiment, active intelligent content is aware of its own timeline, lifecycle, capabilities, limitations, and related information. The active intelligent content is aware of its surroundings and can convert automatically into a format or file type more conducive to the device or environment it is stored in. If the active intelligent content does not have the required tools to make such a transformation, it is self-aware enough to seek out the tools and/or information to make that transformation. Such active intelligent content can be used for enhanced file portability, target advertising, personalization of media, and selective encryption, enhancement, and restriction. The content can also be used to collaborate with other content and provide users with enhanced information based on user preferences, ratings, costs, genres, file types, and the like.

These and other advantages of the disclosure will be apparent to those of ordinary skill in the art by reference to the following detailed description and the accompanying drawings.

DETAILED DESCRIPTION

In at least one embodiment of the present disclosure content becomes 'active' in the sense that has metadata or can point to metadata that can describe the needed transformations, rules, behavior, and life cycle. The 'active' content can point to encrypted web services that can offer information and tools for transformations. Third parties can offer these services and a service provider can focus only on the transport, the localization and the distribution of such objects, leaving the DRM or other elements specific to the content itself to the content provider.

Figure 1:
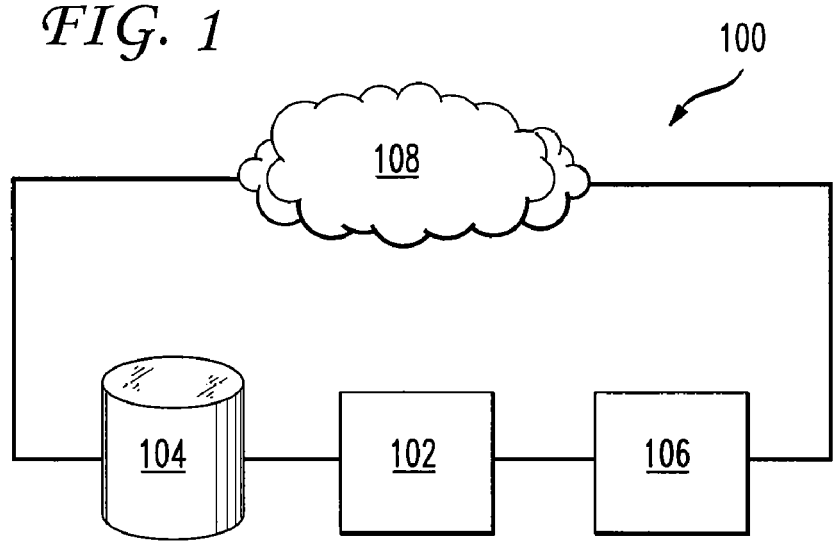
FIG. 1 depicts a media content transformation system according to an embodiment of the present disclosure.

FIG. 1 depicts a media content transformation system 100 according to an embodiment of the present disclosure. Media content transformation system 100 includes a content transformer 102. Content transformer 102 is in communication with a content source 104 and/or one or more tool engines 106 via network 108. Content source 104 and/or tool engines 106 are in communication with content transformer 102 via any appropriate medium, such as a wired or wireless network 108.

Content transformer 102 is any appropriate computer or server configured to create and/or transform active content as will be described below with respect to FIGS. 2-6. That is, content transformer 102 is a computer (e.g., controller 200 of FIG. 2) that converts passive content and/or media into content and/or media that has metadata or can point to metadata that can describe required transformations, rules, behavior, and life cycle.

Content source 104 is a database or other repository of underlying content (e.g., data) to be acted on by content transformer 102. Similarly, tool engines 106 are computers or servers that include information and/or tools that is used by the active content created by content transformer 102. In at least one embodiment, the content created by content transformer 102 includes metadata pointing to the information and/or tools in tool engines 106. Of course, such metadata could simply be a directive to locate a tool engine 106 with the appropriate information and/or tools via network 108.

Figure 2:
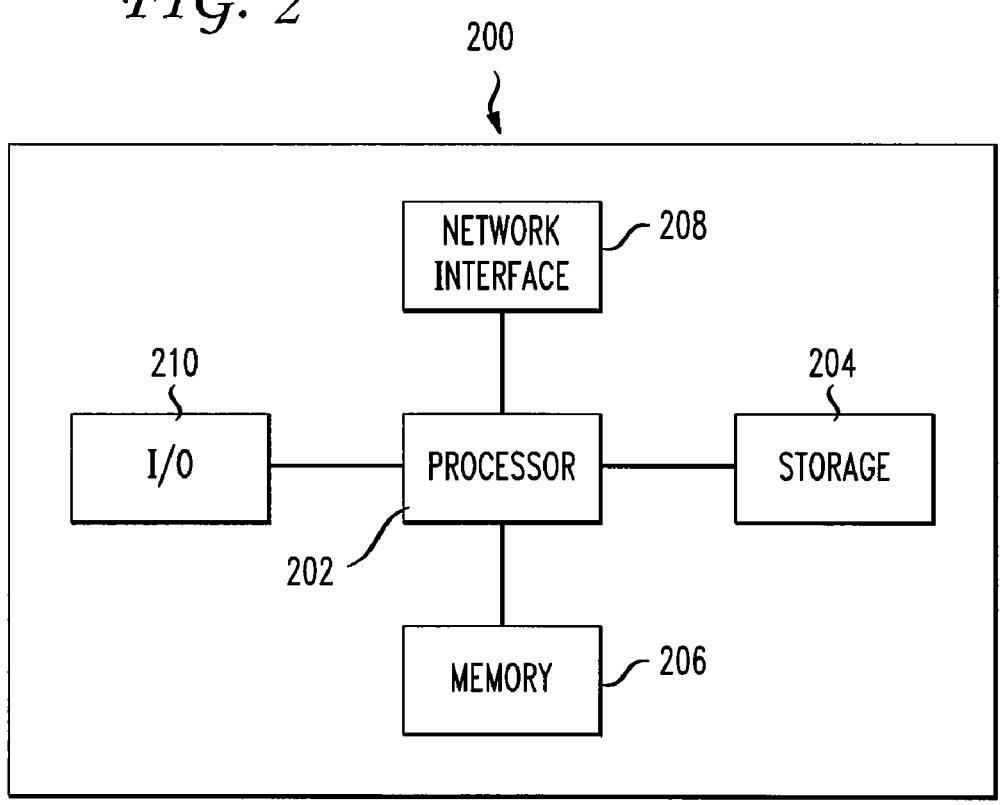
FIG. 2 is a schematic diagram of a controller according to an embodiment of the present disclosure.

FIG. 2 is a schematic drawing of a computer (e.g., controller) 200 according to an embodiment of the disclosure. Computer 200 may be used in conjunction with and/or may perform the functions content transformer 102, content source 104 and/or tool engines 106 of content transformation system 100 and/or the method steps of method 400.

Computer 200 contains a processor 202 that controls the overall operation of the computer 200 by executing computer program instructions, which define such operation. The computer program instructions may be stored in a storage device 204 (e.g., magnetic disk, database, etc.) and loaded into memory 206 when execution of the computer program instructions is desired. Thus, applications for performing the herein-described method steps, such as content transformation in method 400, are defined by the computer program instructions stored in the memory 206 and/or storage 204 and controlled by the processor 202 executing the computer program instructions. The computer 200 may also include one or more network interfaces 208 for communicating with other devices via a network. The computer 200 also includes input/output devices 210 (e.g., display, keyboard, mouse, speakers, buttons, etc.) that enable user interaction with the computer 200. Computer 200 and/or processor 202 may include one or more central processing units, read only memory (ROM)

devices and/or random access memory (RAM) devices. One skilled in the art will recognize that an implementation of an actual computer could contain other components as well, and that the controller of FIG. 2 is a high level representation of some of the components of such a controller for illustrative purposes.

According to some embodiments of the present disclosure, instructions of a program (e.g., controller software) may be read into memory 206, such as from a ROM device to a RAM device or from a LAN adapter to a RAM device. Execution of sequences of the instructions in the program may cause the computer 200 to perform one or more of the method steps described herein, such as those described below with respect to method 400. In alternative embodiments, hard-wired circuitry or integrated circuits may be used in place of, or in combination with, software instructions for implementation of the processes of the present disclosure. Thus, embodiments of the present disclosure are not limited to any specific combination of hardware, firmware, and/or software. The memory 206 may store the software for the computer 600, which may be adapted to execute the software program and thereby operate in accordance with the present disclosure and particularly in accordance with the methods described in detail above. However, it would be understood by one of ordinary skill in the art that the disclosure as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

Figure 3:
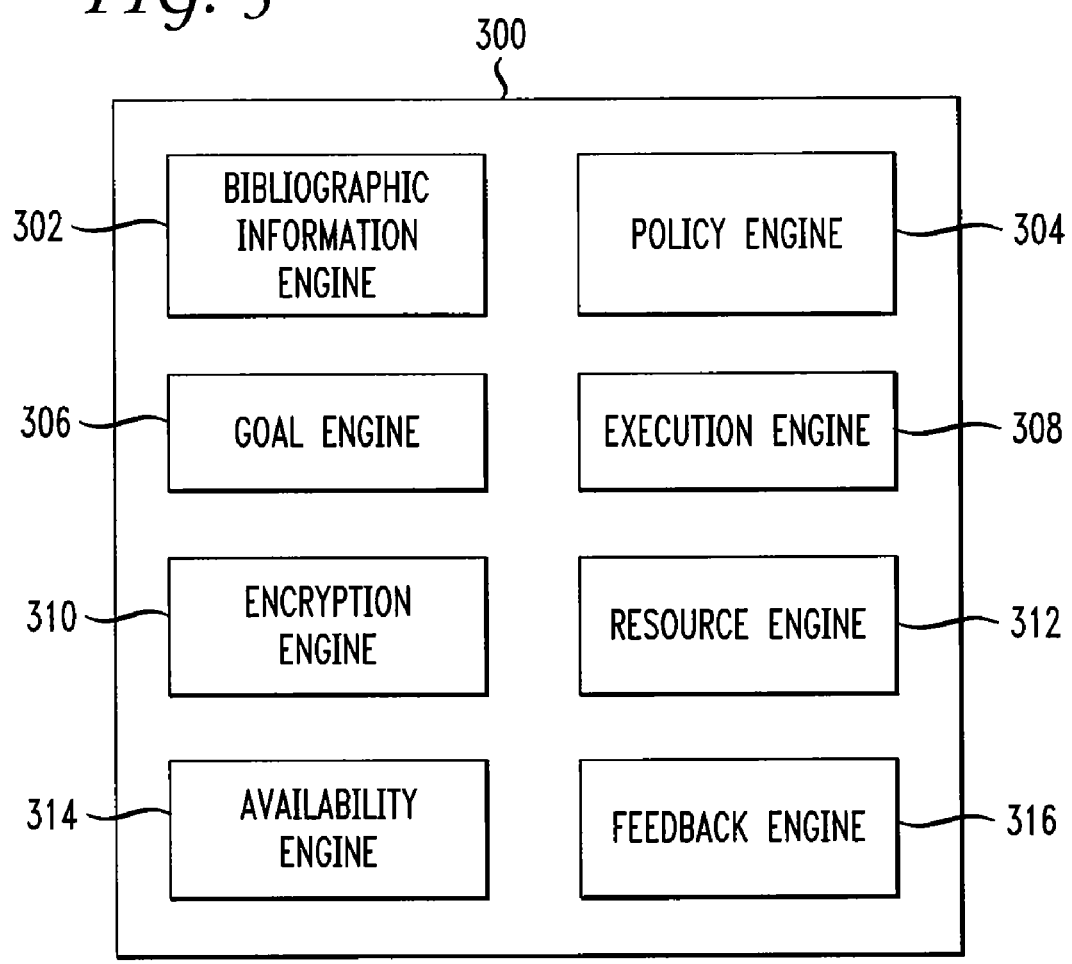
FIG. 3 is a content transformation module according to an embodiment of the present disclosure.

FIG. 3 is a content transformation module 300 according to an embodiment of the present disclosure. Content transformation module 300 is an object or other data structure stored with underlying data (e.g., content). That is, the content transformation module 300 is a container with a set of engines for storing and/or exploiting metadata related to and associated with content data. In this way, content (e.g., audio, video, text, etc.) may become 'active' content by the use of a content transformation module 300.

Content transformation module 300 includes a number of content engines. Though described below as content engines 302-316, it will be understood that these engines may be combined, split, added to, and/or subtracted from such that there are more or less content engines performing any of the functions described herein—even if a function is not specifically ascribed to a particular content engine in the exemplary embodiment of content transformation module 300.

Bibliographic information engine 302 includes information related to the underlying content data. In at least one embodiment, bibliographic information engine includes the type of underlying content, the creation date/time, known transformation types, content ratings, and the like. Types of underlying content include audio, video, text, email, etc. The creation time and/or date is information related to the absolute and/or relative age of the underlying content and/or the content transformation module 300. Such age information is discussed in further detail below with respect to FIG. 5. Known transformation types are other types of content which the original source content may be transformed into. For example, if bibliographic information engine 302 records that the underlying content data is audio or video, a known transformation type may be closed caption text based on that audio. Similarly, in reverse, if the underlying content is text, a speech synthesizer (e.g., used in conjunction with goal engine 306, execution engine 308, and/or resource engine 312) may convert the text into audio. Content ratings information includes information about the rating of all or portions of the underlying content. That is, for content rated by an outside source, the overall underlying content may be rated (e.g., G, PG, etc.) or individual scenes or portions of the underlying content may be rated. Such ratings information may be used in coordination with other engines, such as for pricing of content in conjunction with policy engine 304. Bibliographic information engine 302 manipulates the metadata to reflect current conditions (e.g., current age, current content rating, etc.) based on instructions from outside sources, from pre-set conditions (e.g., existing data escalation conditions, etc.), or from other engines, such as goal engine 306 and/or policy engine 304.

Policy engine 304 includes information related to the digital rights management (DRM) information of the underlying content. As with the bibliographic information engine 302, the policy engine 304 may update or otherwise transform the DRM based on changes to the underlying content. The content can have its own policies, stored in policy engine 304—which can dynamically augment the policies. Based on the age information in bibliographic information engine 302, policy engine 304 can implement policies of timing the underlying content out, instructing movement of the content after a predetermined amount of time has passed, or other time-related policies.

Goal engine 306 includes information related to the goals and/or abilities of the underlying content.

Execution engine 308 includes the tools and/or methods needed to transform content into another content type. Additionally and/or alternatively, execution engine 308 includes pointers and/or a directory of services for the content transformation module 300 to access (e.g., at tool engines 106 via network 108 of content transformation system 100 in FIG. 1). Execution engine 308 may also proactively and/or reactively seek out alternative transformations, transformation methods, and/or tool locations absent an explicit command from elsewhere in content transformation module 300.

Encryption engine 310 includes and/or executes one or more encryption schemes. That includes encryption keys, protection schemes and the like. In this way, encryption engine 310 encrypts underlying content of content transformation module 300. Encryption engine 310 may apply restrictions based on a predetermined condition, such as a hierarchy. That is, some portions of the underlying content may be "open" or globally accessible, while others portions may be made invisible or otherwise restricted (e.g., by encryption key, passwords, etc.). Based on the structure or other factors of the initial content, the encryption engine 310 may also modulate derivative works.

Resource engine 312 points to other intelligence that may be used in the transformation of the underlying content of content transformation module 300. That is, resource engine 312 may work in conjunction with execution engine and/or pointers to information that the content transformation module 300 may access (e.g., at tool engines 106 via network 108 of content transformation system 100 in FIG. 1).

Availability engine 314 is an interface that publishes the capabilities and availabilities of the content transformation module 300. For example, availability engine 314 may indicate that content transformation module 300 (e.g., via execution engine 308) is capable of transforming content into another text format, but is incapable of transforming the content into another language in that text format. Additionally and/or alternatively, availability engine 314 may also include and/or transmit information about formats that the content transformation module 300 is capable of learning. For example, though content transformation module 300 may not currently be capable of translating text into another language, the underlying structure of execution engine 308 may be capable of supporting new tools to perform such a translation and availability engine may broadcast that information to tool engines 106 via network 108.

Feedback engine 316 includes information about the results of transformations undertaken by content transformation module 300, the effectiveness of such transformations, and the usefulness of the results, for example. Such feedback may be used by other engines 302-314 to improve future transformations or may be broadcast (e.g., over network 108) to other information sources.

In this way, engines 302-316 use local and system-wide available resources to perform content transformations without additional user and/or system input. The content, by virtue of the content transformation module 300, may be thought of as operating like a virus in that it can operate independently, grow within the constraints of its engines, evolve over time, and have the ability to contact its creator/distributor for providing status and receiving instructions.

Figure 4:
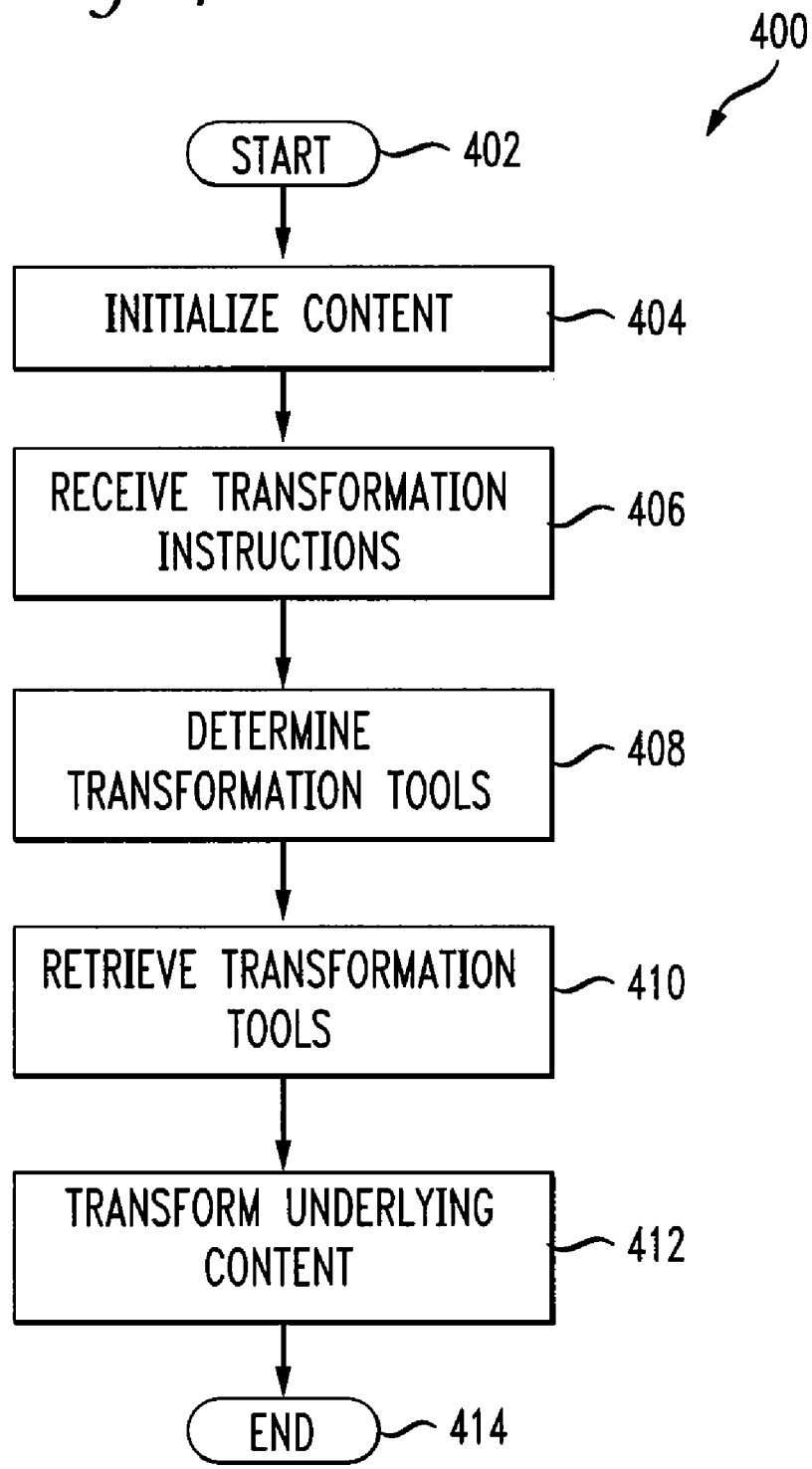
FIG. 4 is a flowchart of a method of content transformation according to an embodiment of the present disclosure.

FIG. 4 is a flowchart of a method 400 of content transformation according to an embodiment of the present disclosure. The method 400 may be performed by content transformer 102 (e.g., in an initialization phase) of content transformation system 100 and/or by content transformation module 300. The method 400 starts at step 402.

In step 404, content is initialized. In at least one embodiment, the bibliographic information in the bibliographic information engine 302 is set and stored based on the underlying content. The policies in policy engine 304, the goals in goal engine 306, the encryption structures in encryption engine 310, the resources in resource engine 312, and the availabilities in availability engine 314 may also be set in step 404. Of course, other aspects of content transformation module 300 may also be set as appropriate.

In step 406, an instruction to transform the underlying content is received. The instruction may be received at execution engine 308 or another location and may include information as to that format the underlying content is to be transformed into, future policies, future encryption, and the like. Additionally and/or alternatively, the instruction may be time based as will be discussed in further detail below with respect to FIG. 5.

In step 408, content transformation module 300 determines the necessary information and/or tools for transformation. Such information and/or tools may include programs, encryption information, policy information, and the like.

In step 410, the necessary information and/or tools for transformation are retrieved. As discussed above, this information may be retrieved from one or more of engines 302-316 (e.g., transformation methods and/or programs from execution engine 308), from content transformer 102, and/or from one or more tool engines 106.

In step 412, the transformation is performed. In at least one embodiment, the underlying content is converted from a first media type or format into a second media type or format. In other embodiments, transformation may refer to enhancement or other changes to the content, such as an increased feature set, awareness, deletion, addition, child and/or sibling content creation, etc. This transformation is performed automatically, without regard for outside interference. In this way, the transformation method 400 makes the content "self-aware" in that it can transform itself into other formats, can fit into a given context, and consumes fewer resources than conventional content transformation. The method 400 ends at step 414.

Figure 5:
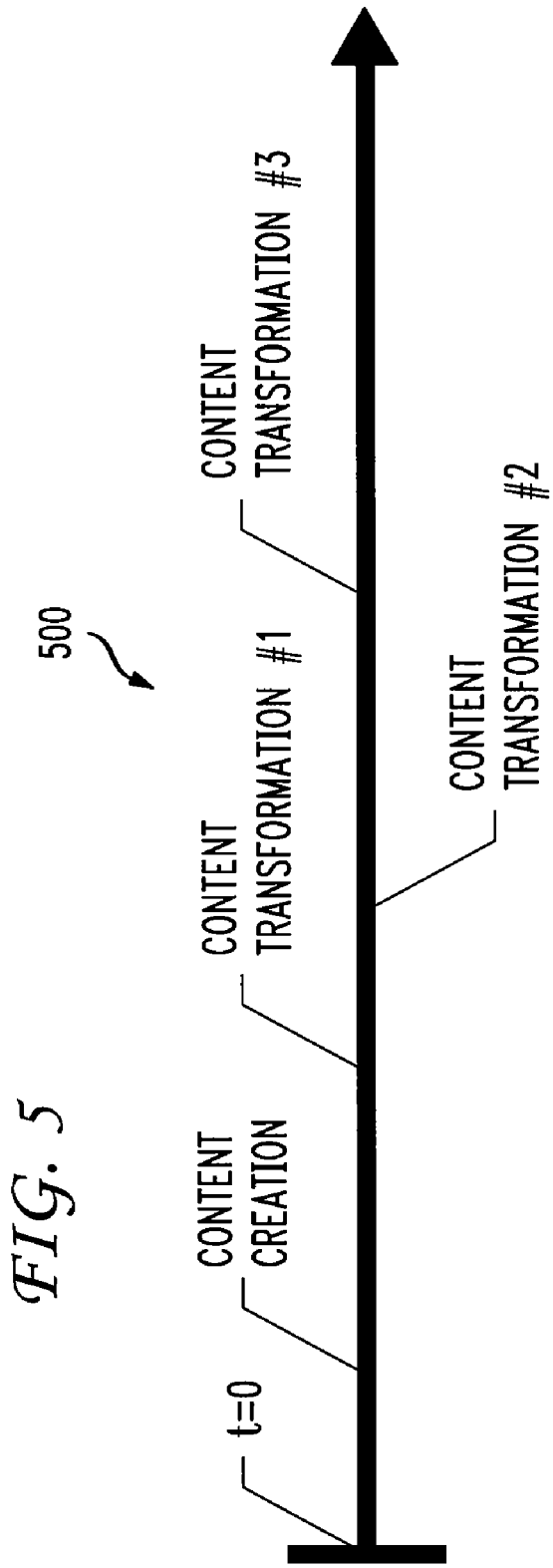
FIG. 5 depicts a timeline of content lifecycle according to an embodiment of the present disclosure.

FIG. 5 depicts a timeline 500 of a content's lifecycle according to an embodiment of the present disclosure. In the exemplary embodiment of FIG. 5, the lifecycle is of content associated with content transformation module 300 and/or other related (e.g., child and/or sibling) content.

Content is created as described above. For example, a particular file (e.g., an audio file) is created with identity information in the bibliographic information engine 302 along with basic descriptions of the current content. Policy engine 304 includes basic policies and goal engine 306 includes goals for the content.

At some time after content creation, the content is said to be actively achieving its goals. The content (e.g., with content transformation module 300) has increased features and awareness of the environment (e.g., the device it is currently stored on, etc.) as well as collaborative features available to it. This may be considered an initial transformation as described above with respect to FIG. 4. That is, though the content's format may not have changed, many other associated transformational and/or bibliographic features have changed.

At a later time, a second transformation occurs. In this example, a derivative (e.g., child) work is created based on the original content. For example, the derivative work could be text generated from the audio file. This derivative work could include additional content from another source (e.g., content source 104 of content transformation system 100). In another example, a different file format for the same file type may be generated based on need. For example, if the audio file is moved from a Microsoft-based portable media player to an Apple-based portable media player, the file may sense the change via feedback engine 316 and/or bibliographic information engine 302 and execution engine 308, encryption engine 310, and policy engine 304 may convert the file from WMA format to MP3 format.

After the second transformation, the original version of the content may be considered "old." If the old version is considered obsolete, the active content may delete itself as a third transformation. Additionally and/or alternatively, the old version may monitor its own usage, its usage relative to related versions, and may perform other tasks as a third transformation.

As described above in terms of particular modules, engines, and examples, content and the metadata associated with it is converted into active intelligent content. The active intelligent content is aware of its own timeline, lifecycle, capabilities, limitations, and related information. Additionally, the active intelligent content is aware of its surroundings and can convert automatically into a format or file type more conducive to the device or environment it is stored in. Additionally, if the active intelligent content does not have the required tools to make such a transformation, it is self-aware enough to seek out the tools and/or information to make that transformation. In this way, the underlying content can be "set free" as a virus-like entity.

Such active intelligent content can be used for enhanced file portability, target advertising, personalization of media, and selective encryption, enhancement, and restriction. The content can also be used to collaborate with other content and provide users with enhanced information based on user preferences, ratings, costs, genres, file types, and the like.

The foregoing Detailed Description is to be understood as being in every respect illustrative and exemplary, but not restrictive, and the scope of the present general inventive concept disclosed herein is not to be determined from the Detailed Description, but rather from the claims as interpreted according to the full breadth permitted by the patent laws. It is to be understood that the embodiments shown and described herein are only illustrative of the principles of the present general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A computer comprising:
a processor; and
a memory configured to store a data structure comprising a bibliographic information engine, an encryption engine, a resource engine, an execution engine, and a policy engine, wherein:
the bibliographic information engine is configured to store content information including information associated with content in a first format;
the encryption engine is configured to encrypt a first portion of the content based on the content information stored at the bibliographic information engine;
the resource engine is configured to store a transformation module;
the execution engine comprises a directory of content transformation services accessible via a network and is configured to:
access a content transformation service via the network; and
transform the content from the first format to a second format with the transformation module; and
the policy engine is configured to implement a time related policy with respect to the content, wherein the time related policy comprises deletion of the content based on an age of the content.

2. The computer of claim 1, wherein the data structure further comprises:
a goal engine.

3. The computer of claim 1, wherein the data structure further comprises:
an availability engine configured to broadcast an availability of the content in the first format.

4. A method of content transformation at a content transformation module comprising:
initializing content information, the content information including information associated with content in a first format;
encrypting at least a first portion of the content based at least in part on the content information stored at a bibliographic information engine;
identifying a transformation tool necessary to transform the content from the first format to a second format, wherein the transformation tool comprises a transformation service accessible via a network;
automatically retrieving the transformation tool via the network;
transforming the content from the first format to the second format; and
implementing a time-related policy with respect to the content, wherein implementing the time related policy comprises deleting the content based on an age of the content.

5. The method of claim 4, further comprising
storing a policy associated with the content.

6. The method of claim 4, further comprising:
broadcasting an availability of the content in the first format.

7. A non-transitory computer readable medium storing computer program instructions for performing a method of content transformation at a content transformation module—which, when executed on a processor, cause the processor to perform a method comprising:
initializing content information, the content information including information associated with content in a first format;
encrypting a first portion of the content based on the content information stored at a bibliographic information engine;
identifying a transformation tool necessary to transform the content from the first format to a second format, wherein the transformation tool comprises a transformation service accessible via a network;
automatically retrieving the transformation tool via the network;
transforming the content from the first format to the second format; and
implementing a time-related policy with respect to the content, wherein implementing the time related policy comprises deleting the content based on an age of the content.

8. The non-transitory computer readable medium of claim 7, further comprising computer executable instructions defining:
storing a policy associated with the content.

9. The non-transitory computer readable medium of claim 7, further comprising computer executable instructions defining:
broadcasting an availability of the content in the first format.

* * * * *